(12) United States Patent
Toussaint et al.

(10) Patent No.: US 9,588,327 B2
(45) Date of Patent: Mar. 7, 2017

(54) NANOINDENTER MULTIMODAL MICROSCOPE OBJECTIVE FOR MECHANOBIOLOGY

(71) Applicant: The Board of Trustees of the University of Illinois, Urbana, IL (US)

(72) Inventors: Kimani Toussaint, Champaign, IL (US); Placid Ferreira, Champaign, IL (US); Amy Wagoner Johnson, Urbana, IL (US); William Wilson, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 73 days.

(21) Appl. No.: 14/537,096

(22) Filed: Nov. 10, 2014

(65) Prior Publication Data
US 2015/0168239 A1    Jun. 18, 2015

Related U.S. Application Data

(60) Provisional application No. 61/915,324, filed on Dec. 12, 2013.

(51) Int. Cl.
| | |
|---|---|
| *G01L 1/24* | (2006.01) |
| *G02B 21/04* | (2006.01) |
| *G01Q 30/02* | (2010.01) |
| *G01Q 60/36* | (2010.01) |

(52) U.S. Cl.
CPC .......... *G02B 21/04* (2013.01); *G01Q 30/025* (2013.01); *G01Q 60/366* (2013.01)

(58) Field of Classification Search
CPC combination set(s) only.
See application file for complete search history.

(56) References Cited

U.S. PATENT DOCUMENTS

| | | | |
|---|---|---|---|
| 2006/0160136 A1* | 7/2006 | Xiang | G01N 24/087 435/7.1 |
| 2007/0220978 A1* | 9/2007 | Su | G01N 29/0681 73/632 |
| 2010/0016783 A1* | 1/2010 | Bourke, Jr. | A61K 41/0057 604/20 |

(Continued)

OTHER PUBLICATIONS

Carrillo et al. "Nanoindentation of polydimethylsiloxane elastomers: Effect of crosslinking, work of adhesion, and fluid environment on elastic modulus," *J. Mater. Res.*, vol. 20, No. 10, pp. 2820-2830 (Oct. 2005).

(Continued)

*Primary Examiner* — Phillip A Johnston
*Assistant Examiner* — Hsien Tsai
(74) *Attorney, Agent, or Firm* — Sunstein Kann Murphy & Timbers LLP (57) ABSTRACT

Methods and apparatus for characterizing a sample in situ as to both its mechanical and optical characteristics. The apparatus comprises a reflective microscope with a concave primary mirror and a convex secondary mirror sharing a common optical axis, and an actuator vignetted by the convex secondary mirror for applying a force to a nanoprobe in a direction having a component along the common optical axis. The apparatus may addition include a source for generating an illuminating beam, a detector, and a processor for forming an image based on a signal provided by the detector.

16 Claims, 6 Drawing Sheets

(56) References Cited

U.S. PATENT DOCUMENTS

2010/0095780 A1* 4/2010 Oh .................. B81C 99/005
  73/774
2010/0275334 A1* 10/2010 Proksch ............. B82Y 35/00
  850/33

OTHER PUBLICATIONS

Deuschle et al. "In situ indentation testing of elastomers," *Acta Materialia*, vol. 56, pp. 4390-4401 (2008).
Reza et al. "Toraldo filters with concentric unequal annuli of fixed phase by evolutionary programming," *J. Opt. Soc. Am. A*, vol. 30, No. 2, pp. 189-195 (Feb. 2013).
Sauer et al. "Influence of Viscosity on Forced and Spontaneous Spreading. Wilhelmy Fiber Studies Including Practical Methods for Rapid Viscosity Measurement," *J. Colloid. Interf Sci.*, vol. 199, pp. 28-37 (1998).
Steel "The Design of Reflecting Microscope Objectives," *Aust. J. Sci. Res. Ser. A*, vol. 4, pp. 1-11 (1951).
Yazdanpanah et al. "Micro-Wilhelmy and Related Liquid Property Measurements Using Constant-Diameter Nanoneedle-Tipped Atomic Force Microscope Probes," *Langmuir*, vol. 24, pp. 13753-13764 (2008).

* cited by examiner

NANOINDENTER MULTIMODAL MICROSCOPE OBJECTIVE FOR MECHANOBIOLOGY

The present application claims the priority of U.S. Provisional Patent Application Ser. No. 61/915,324, filed Dec. 12, 2013, and incorporated herein by reference.

TECHNICAL FIELD

The present invention relates to apparatus and methods for concurrent optical and nanomechanical characterization of a sample.

BACKGROUND ART

Mechanobiology studies the effect of physical forces on biological tissue. Directly correlating mechanical and structural information, however, presents a major challenge for both existing imaging and for technologies that provide for characterizing the response of tissue to mechanical force. In the context of mechanobiology, optical microscopy techniques provide noninvasive imaging of biological specimens such as cells, and the extracellular matrix. However, optical imaging methods cannot provide information about the mechanical properties of the imaged tissue. The closest approach to the use of optical techniques to obtain mechanical data has come from the use of optical tweezers (a non-imaging technique) as a force probe. However, that approach is limited to maximum applied forces on the order of pN and are not appropriate for tissue-level testing—thereby limiting the technique to a very narrow window of problems in biology.

The various modalities for characterizing measures of mechanical properties for soft tissues can be made using several modalities, but each has its drawbacks. Modalities for characterizing measures of mechanical properties include bulk testing (e.g. tension, compression), macroscale indentation (i.e. hardness testing), atomic force microscopy (AFM), and instrumented nanoindentation (NI). Drawbacks associated with bulk testing include the requirements of sample preparation appropriate to the testing mode and the inability to measure local properties. For example, for tensile tests one needs to grip the sample at both ends. This is difficult for most tissues as they are soft and slippery, and therefore can slide out of the grips if not gripped tightly enough, or, tissue may be damaged if gripped too intensely. Furthermore, all tissues are inherently heterogeneous in structure (and, therefore, properties), often over only 100s of microns. This heterogeneity is lost in bulk testing since the data represent an average over the entire sample, which is more typically in the size range of millimeters or centimeters. Local measures, such as AFM and NI, however, provide for capturing this heterogeneity.

AFM was developed primarily for high-resolution (nm scale) topographical surface profiling. Quantification of mechanical properties using AFM is complicated because probe stiffness and geometry vary between probes, and thus each must be accurately characterized in order to have accurate force measurements. Specifically, the cantilever stiffness and the tip geometry must each be measured. Since cantilevers often last only one test sample, cantilever stiffness must be calibrated with each sample.

Nanoindentation has been used to characterize mechanical properties of a sample, such as the Young's modulus as a function of depth, etc., since the early 1990s. NI has also been accompanied by scanning probe imaging techniques in order to elucidate morphological characteristics of the surface undergoing NI. However, it has not been possible, heretofore, to apply optical techniques, whether for imaging in scatter, or for non-linear optical modalities such as second-harmonic generation (SHG), for example, to the identical region of a sample subject to NI. This has proven to be a severe limitation of the NI technique.

It would be highly desirable, therefore, to provide researchers, especially in the study of biological tissue, with an instrument that enables concurrent NI and optical access to the same region of a probed sample. A device that provides such functionality is described for the first time herein.

SUMMARY OF EMBODIMENTS OF THE INVENTION

In accordance with embodiments of the invention, apparatuses and methods are provided for characterizing a sample in situ. In accordance with one set of embodiments of the invention, method are provided having steps of:
applying a force, by means of a nanoprobe, centered upon a probed locus on the surface of a sample;
illuminating, with light, a region of the sample including the said probed locus on the surface of the sample;
measuring a mechanical response of the sample to the applied force; and
characterizing an optical interaction between the illuminating light and the region of the sample including the probed locus.

In accordance with further embodiments of the present invention, the nanoprobe may be a nanoindenter or a tip of an atomic force microscope. The measured mechanical response may be a displacement as a function of force.

In various alternate embodiments of the present invention, the optical interaction may be light scattering or a non-linear optical interaction. The optical interaction may be fluorescence, or second-harmonic generation, or two-photon fluorescence. Characterizing the optical interaction may include spectral resolution of light scattered by, or otherwise interacting with the region of the sample including the probed locus.

In accordance with another aspect of the present invention, a microscope object is provided that has a Schwarzschild objective with a concave primary mirror and a convex secondary mirror. The primary and convex secondary mirrors share a common optical axis. The microscope objective also has an actuator vignetted (or obscured) by the convex secondary mirror for applying a force to a nanoprobe in a direction having a component along the common optical axis.

In other embodiments of the invention, the actuator may include a MEMS actuator. The Schwarzschild objective may be characterized by a numerical aperture of less than 0.5.

In accordance with a further aspect of the present invention, an apparatus is provided for characterizing a sample that has a source for generating an illuminating beam and a a reflective objective for coupling the illuminating beam onto an illuminated region of a surface of a sample. A nanoindenter, integral with the reflective objective, is adapted for applying a force to a locus of the sample included within the illuminated region of the surface of the sample. A detector receives receiving light emanating from the illuminated region of the surface of the sample coupled via the reflective objective and generates a detector signal, while a processor is provided for forming an image based at least upon the detector signal.

In other embodiments of the present invention, the reflective objective may be a Schwartzchild objective. The nanoindenter may include an actuator for applying a force to a nanotip. The actuator may include a MEMS force probe, and may also include a MEMS electrostatic comb drive.

BRIEF DESCRIPTION OF THE DRAWINGS

The foregoing features of the invention will be more readily understood by reference to the following detailed description, taken with reference to the accompanying drawings, in which:

FIG. 1B shows an axial nanoindenter. Nanoindenters shown in FIGS. 1A and 1B are known in the art, and may be used in conjunction with embodiments of the present invention, as described below.

DETAILED DESCRIPTION OF EMBODIMENTS OF THE INVENTION

Definitions

The term "image" shall refer to any multidimensional representation, whether in tangible or otherwise perceptible form, or otherwise, wherein a value of some characteristic (amplitude, phase, etc.) is associated with each of a plurality of locations (or, vectors in a Euclidean space, typically $\mathcal{R}^2$) corresponding to dimensional coordinates of an object in physical space, though not necessarily mapped one-to-one thereonto. Thus, for example, the graphic display of the spatial distribution of some field, either scalar or vectorial, such as brightness or color, or intensity of a generated second harmonic, constitutes an image. So, also, does an array of numbers, such as a 3D holographic dataset, in a computer memory or holographic medium. Similarly, "imaging" refers to the rendering of a stated physical characteristic in terms of one or more images.

The terms "object," "sample," and "specimen" shall refer, interchangeably, to a tangible, non-transitory physical object capable of being rendered as an image, unless the context requires otherwise.

When used to modify terms such as "beam," "pulse," etc., the terms "sample" and "signal" are used herein interchangeably.

The term "biological tissue," as used herein and in any appended claim, shall mean an organized ensemble of interconnected cells of an organism.

The expression "the same spatial location," as used herein, refers to coregistration to within the spatial resolution of a referenced optical imaging modality.

The expression "imaging a region" shall denote imaging a region contiguous with a specified pixel.

The term "multimodal," as applied herein to techniques for characterization of the interaction between light and a medium shall refer to all such techniques in the aggregate. Examples, provided without limitation, include brightfield scattering, fluorescence, two-photon fluorescence (TPF), second-harmonic generation (SHG), coherent anti-Stokes Raman spectroscopy (CARS), tip-enhanced Raman spectroscopy (TERS), Fourier transform infrared (FTIR) spectroscopy, etc.

A "nanoprobe," as the term is used herein, shall refer to any controllable mechanical structure that may be used for characterizing a response of a solid material (such as biological tissue, for example) to application of a force over a region of the solid material characterized by a linear dimension smaller than 500 μm. Thus, for example, a nanoprobe may be the tip of an atomic force microscope (AFM) or a nanoindenter (NI), as discussed in detail below.

The term "in situ," as the term is used herein, shall refer probing a sample, using distinct modalities (such as optical and mechanical modalities, for example) without moving the sample between measurements using each of the distinct modalities.

Figure 1A:
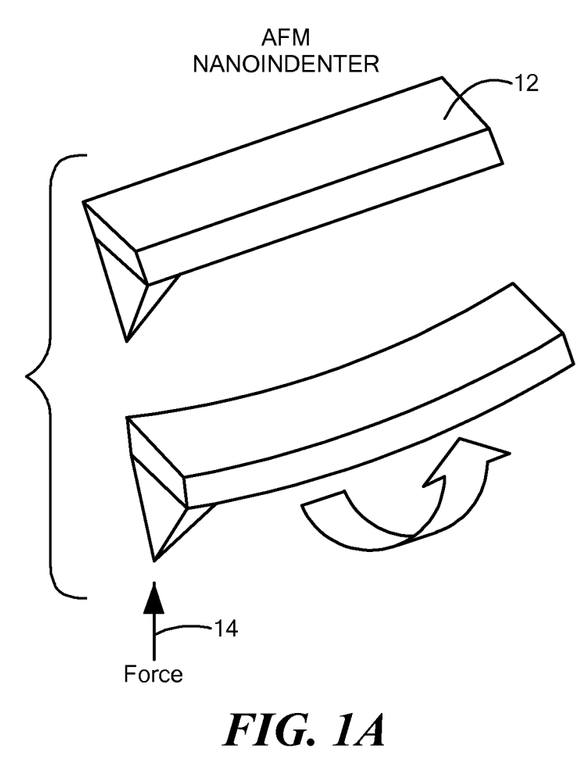
FIG. 1A shows AFM nanoindenters in flexed and unflexed conformations.
Figure 1B:
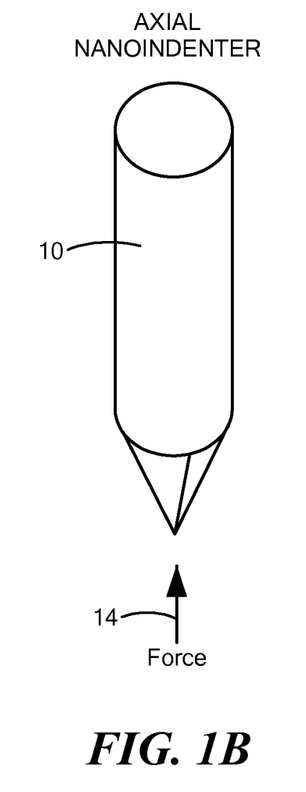

An alternative to AFM techniques for measuring local elastic properties at small scales is NI. NI was originally developed for hard materials, and has found application, more recently, to the measurement of properties of soft biological materials. In comparison to AFM, an axial indenter 10 for NI, depicted in FIG. 1B, is a rigid probe, not a cantilever 12, and therefore not influenced by bending forces. The rigidity of the NI probe mitigates the challenges of probe characterization. For biological force measurements, the force 14 that may be applied ranges for standard NI between about 100 nN to about 10 μN compared to AFM (~pN to 100 μN), but does not allow a form-factor that permits integration with most imaging modalities, especially nonlinear imaging techniques, without significant occlusion and physical interference. In addition, NI can be operated under either load or displacement control, while AFM cannot. This enables characterization of both creep and stress relaxation behavior, respectively, both important for biological samples due to their viscoelastic nature. Nanoindenters, however, have been subject to the imaging limitations of AFM, since there has been no other means to acquire an image of the tissue being mechanically probed by NI.

Figure 2:
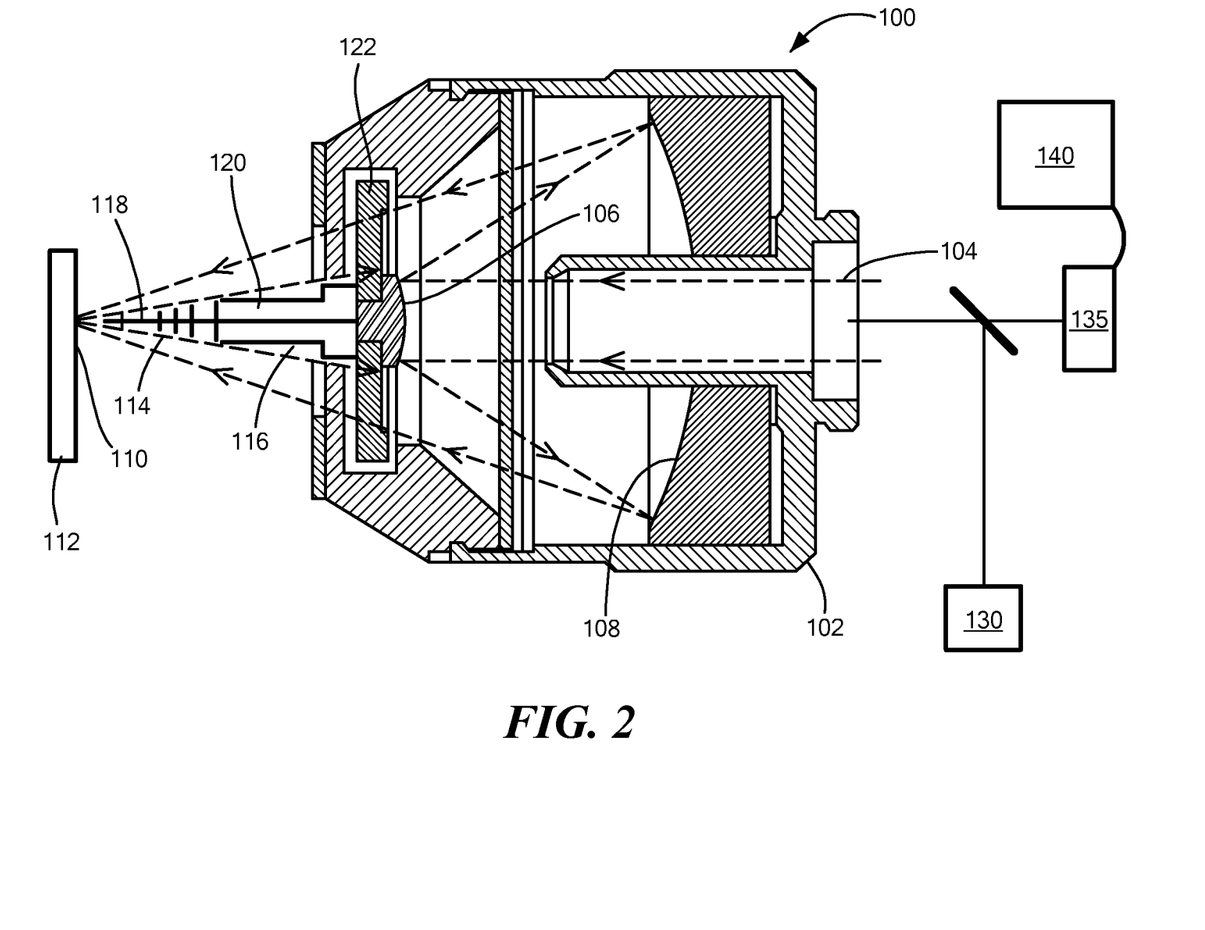
FIG. 2 shows a cross-sectional view of a nanoindenter microscope objective in accordance with an embodiment of the present invention.

In accordance with embodiments of the present invention described in detail herein, a nanoindenter microscope objective 100 capable of providing high-resolution imaging and low-force indentation of biological samples at the same spatial location is provided as described with reference to FIG. 2. Nanoindenter microscope objective 100 may advantageously provide for both structural and mechanical properties to be obtained. Furthermore, it may allow for the elucidation of complex, coupled behaviors that cannot be characterized with any other current approaches. Nanoindenter microscope instrument 100 may be referred to herein, for convenience of notation, as a "nanoindenter multimodal microscope objective" (NIMMO). NIMMO addresses the aforementioned metrology challenges in mechanobiology by way of a specialized microscope objective which permits the unique combination of NI with multimodal imaging, where the term "multimodal" is used as defined above.

Figure 3A:
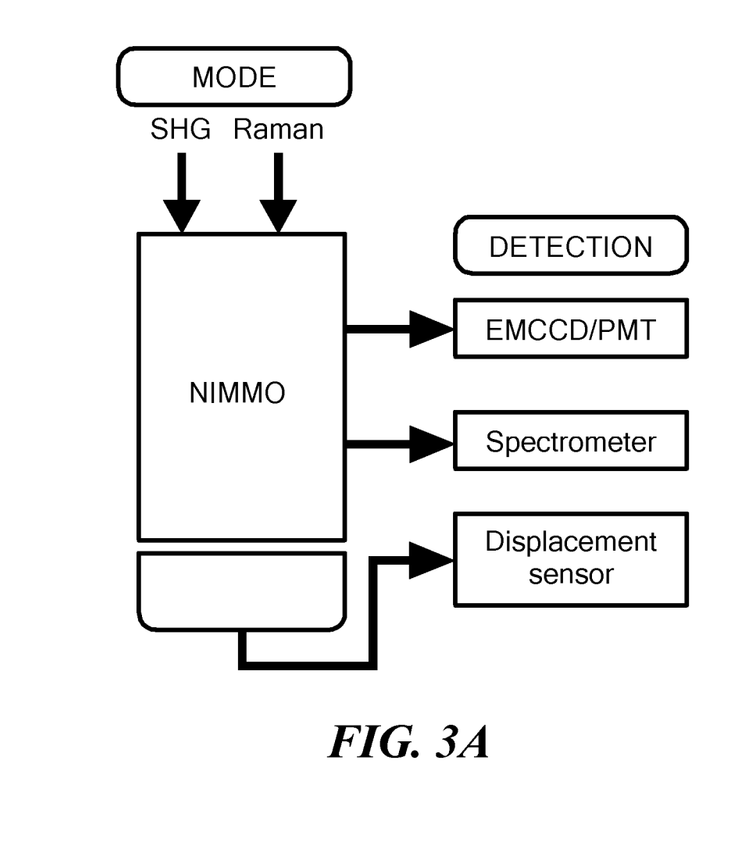
FIG. 3A schematically depicts modes of operation compatible with the nanoindenter multimodal microscope objective in accordance with the present invention, with FIG. 3B schematically depicts characteristics of biological material subject to measurement in accordance with embodiments of the present invention.
Figure 3B:
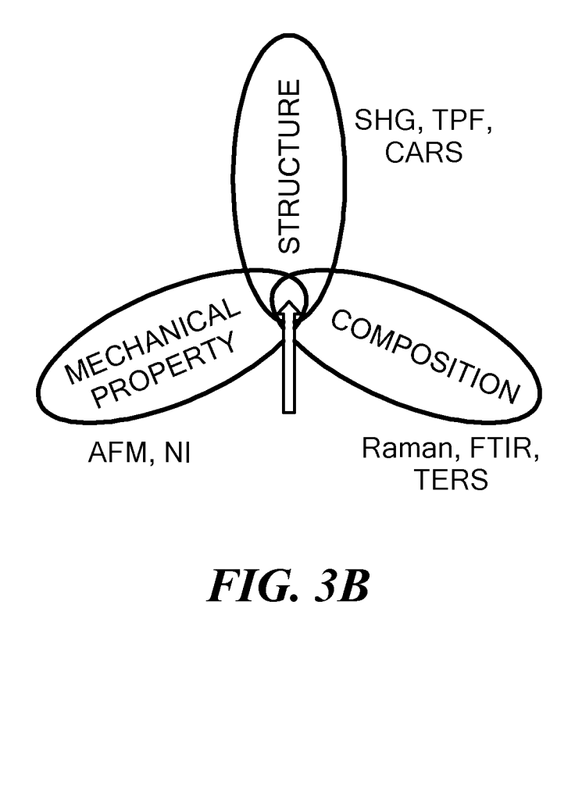

NIMMO 100 comprises an optical objective 102 that is based on the use of reflective optics, and thus obviates the focusing errors due to chromatic aberration, i.e., error due to different wavelengths focusing to different axial locations. Optical objective 102 may be embodied as a Schwartzschild objective, as depicted in FIG. 2. Incident illuminating light 104 from a source of illumination 130 is reflected by a convex secondary mirror 106 onto a concave primary mirror 108, from which the light is focused at surface 110 of specimen 112. A direct consequence is that the optical objective 102 is readily compatible with both standard light microscopy techniques (e.g., brightfield/fluorescence microscopy), nonlinear imaging methods (e.g., SHG, TPF, and CARS), and spectroscopic microscopy techniques (Raman, TERS, and FTIR); the major differences between the modes of operations will be with the excitation (e.g., pulsed laser or broad spectrum lamp) and detection (e.g., EMCCD, PMT or spectrometer) employed as depicted schematically in FIG. 3A. As a result, information about a sample's structure (via optical imaging), composition (via spectroscopy), and mechanical properties (via nanoindentation) are amenable to extraction using the same instrument, as depicted schematically in FIG. 3B. Further, NIMMO 100 may advantageously be moved from one optical microscope platform to another.

In accordance with the present invention, a custom microelectro-mechanical systems (MEMS) force probe 114 with reflective microscope objective 102, the latter of which is inherently insensitive to chromatic aberration, as further discussed below. A commercial reflective objective with standard parameters such as numerical aperture (NA) of 0.3-0.5, working distance of 7.8-24.1 mm, magnification of 15-40×, and focal length of 5-13.3 mm may be used, although these parameters are provided solely as a matter of guidance, and without limitation. The typical diameter of the platform for the primary mirror 108 is 8.5 mm. Such objectives are widely available from common distributors of optical components and equipment. A MEMS force probe 114 can be placed behind the secondary mirror 106, for example, by mounting to die 116, as indicated in FIG. 2.

Light from sample 112, arising due to scattering or to any of the light-interaction modalities described above, is imaged onto detector 135 which generates a detector signal that is received and processed by processor 140 into an image, as defined above.

Standard reflective objectives 102, also referred to as Schwarzschild objectives, are typically used for imaging applications in the ultraviolet and infrared regions of the electromagnetic spectrum. The obvious advantage in these cases is that such objectives are independent of chromatic aberrations, i.e., wavelength-dependent focusing. Such an objective is considered a monocentric optical system comprising two spherical surfaces, one concave (primary mirror 108) and the other convex (secondary mirror 106, from the perspective of a point source located at the focus), whereby the first has an open aperture at its geometric center and the second is of smaller radius and is centered with respect to the first surface. An example schematic of such a system is given in FIG. 2. By satisfying such a design and ensuring that $r_1=(\sqrt{5}-1)f'$, $r_2=(\sqrt{5}+1)f'$, where $r_1$ and $r_2$ are the respective radii of the convex (primary) and concave (secondary) mirrors and f' is the focal length, the Schwarzschild objective completely eliminates primary spherical aberration. Note that there is an interdependency between the radii and focal length such that $r_2/r_1=c_1/c_2=(3\pm\sqrt{5})/2$ and $f'=0.5(c_1-c_2)$. Placement of the primary mirror 108 such that it is centered with respect to the secondary mirror 106 alleviates spherical aberration with the tradeoff of obscuration, or blocking of a portion of the illumination light. For this objective, the obscuration ratio, i.e., the angle of obscuration measured from the object, is given by $\sin A/\sin U_2'$. It is known in the art that an obscuration ratio larger than 0.3, while providing slightly higher resolution, results in lower contrast. This can be understood from the fact that annular focusing results in an increase in spatial resolution as well as a concomitant increase in the first diffraction ring, the effect of the latter is a decrease in contrast. This is a well-known effect from point-spread function engineering. Fortunately, many commercial objectives have an obscuration ratio of 0.25 or less. In this case, at an illumination wavelength of 800 nm, the expected transverse and axial spatial resolutions for either SHG or TPF imaging is ~1.55 μm and 17.3 μm, respectively. This is an increase of approximately 17% in spatial resolution compared to the resolution obtained using a standard diffraction-limited lens of the same numerical aperture (NA), that satisfies the Abbe sine condition.

Within the context of NIMMO, a MEMS force probe 114 serves as the indenter. FIG. 2 shows a schematic of the integration of MEMS probe 114 on the reflective objective 102. The die 116 for the MEMS probe 114 is mounted on its edge so that probe stem 118 is aligned with the optical axis of the objective 102 and accesses the specimen 112 directly above the center of the field of view. Probe stem 118 may also be referred to herein as a "nanoprobe," defined above. The die 116 for the MEMS probe 114 is shaped so that it lies within the umbral cone 120 occluded by the secondary mirror 106 of the objective. Die 116 may be coupled to the back of the primary mirror by a precision adjustable mount (not shown). Webs 122 that hold the secondary mirror are used for routing the probe's interconnects to the exterior of the objective without disturbing the optical field of view. All non-functional surfaces of the probe may be anodically roughened to prevent unwanted reflection of scattered light.

In accordance with preferred embodiments of the present invention, MEMS probe 114 on 15 mm² dies 116 work at a 25 nN resolution. Further, by adjusting the spring stiffness as well as the dimensions and spacings of the sensing/actuation combs, different force probes designs can be explored that will tradeoff force range for displacement resolution. Three different force probes are currently preferred for practice of the present invention. The characteristics of the preferred are summarized in Table I in terms of maximum force and displacement in material. Within the scope of the present invention, the MEMS force probe device 114 may be designed to accommodate different tips 118 including flat punch, flat end, conical, and ball indenter to accommodate the variety of biological samples to which the instrument can be applied. Typically, tip 118 ranges in diameter between 25-500 μm, although the size of the tip is not limited within the scope of the present invention.

TABLE I

| | MEASUREMENT RANGE | OPEN-LOOP RESOLUTION | OPEN-LOOP DISPLACEMENT | CLOSED-LOOP RESOLUTION | CLOSED-LOOP DISPLACEMENT |
|---|---|---|---|---|---|
| DEVICE 1 | up to 1 mN | 100 nN | 5-10 nm | 100-200 nN | 10 nm |
| DEVICE 2 | up to 1 μN | 10 nN | 5 nm | 10-50 nN | 1-5 nm |
| DEVICE 3 | up to 100 nN | 0.1 nN | 0.1 nm | 1 nN | 1 nm |

The use of a low-NA reflective objective 102 for nonlinear microscopy, and, in particular, for SHG imaging, has been demonstrated, and, additionally, enhancement of signal-to-noise by phase-sensitive detection has also been achieved.

A probe capable of operating in either displacement or force control is now described with reference to FIGS. 4A-4D. A probe actuator, designated generally by numeral 400, is characterized by a typical position range of 40 μm to within 5-nm resolution, and force control 300 μN with a resolution of 25 nN. The probe 400 is actuated by an electrostatic comb drive 402 with an integrated capacitive sensor. The device has dimensions of 4×6 mm and therefore fits onto the end of the microscope objective 102.

Figure 4A:
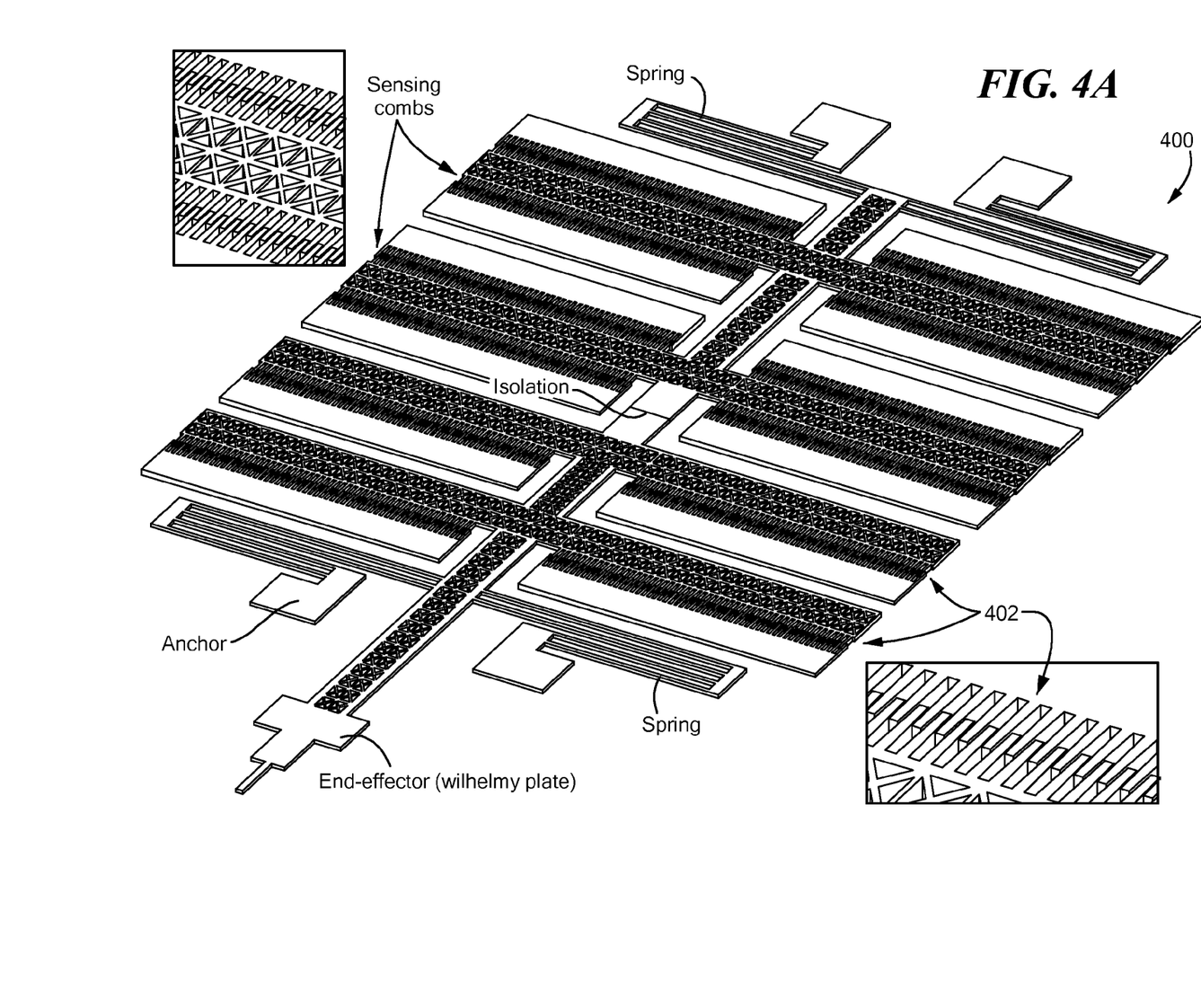
FIG. 4A shows a MEMS probe, in accordance with the present invention.
Figure 4B:
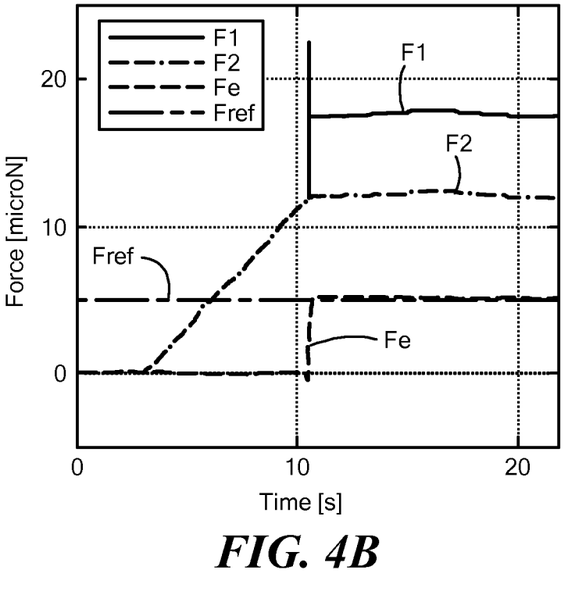
FIGS. 4B-4D depict, respectively, temporal traces of force applied by the probe (as measured in micron displacement), applied and reference forces, and actual measured displacement of a polydimethylsiloxane (PDMS) thin film.
Figure 4C:
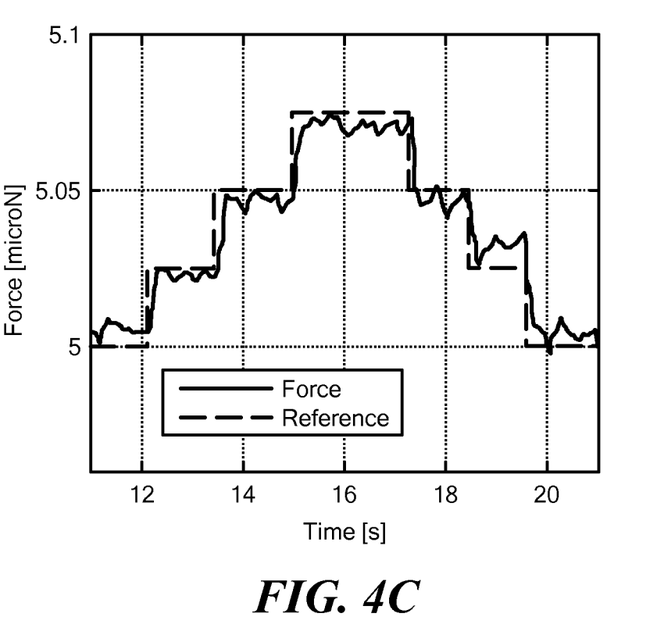
Figure 4D:
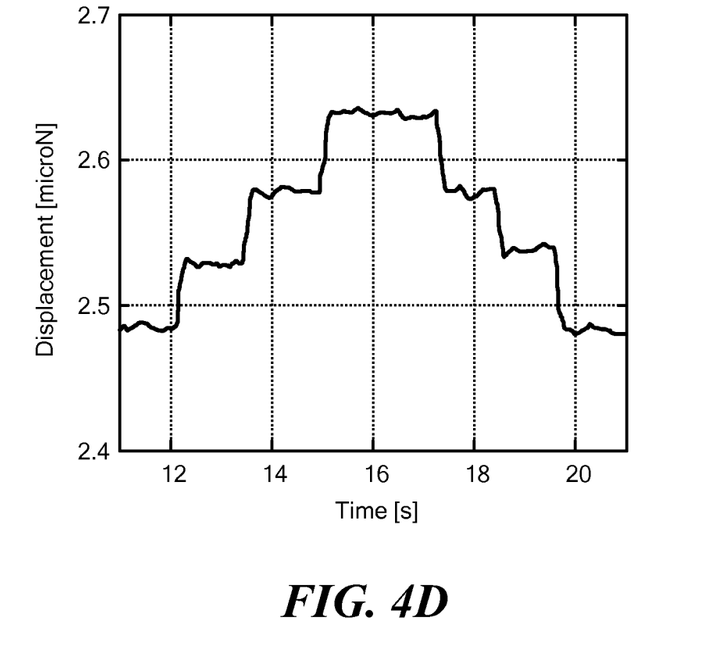

Device calibration was performed using multiple independent methods and demonstrated by using the probe 400 as a Wilhelmy plate tensiometer and by measuring the stiffness of a soft polymer film. Data showing the sensitivity in controlled-force mode for indentation of a PDMS thin film is shown in FIGS. 4B-4D. In these data, the controller applies a reference input of 5 μN ($F_{ref}$). When the probe 114 encounters the sample 112, the effective force ($F_e$), or the difference between the actuator force ($F_2$) and the force deflecting the leafspring ($F_1$), is 5 μN, as plotted in FIG. 4B. The controller increases/decreases the reference force (shown in square steps in FIG. 4C) in 25-nN steps and the effective force tracks extremely well, as shown in FIG. 4C. The corresponding displacement is shown in FIG. 4D.

The design discussed above is preferred to implementation using an AFM because it can control and measure either force or displacement directly, rather than only measuring force indirectly from a cantilever. AFM, also encompassed within the scope of the present invention, has better force resolution at the smallest scale, but is limited to smaller loads.

The embodiments of the invention described above are intended to be merely exemplary; numerous variations and modifications will be apparent to those skilled in the art. All such variations and modifications are intended to be within the scope of the present invention as defined in any appended claims.

We claim:

1. A method for characterizing a sample in situ, the method comprising:
    a. applying a force, by means of a nanoprobe, disposed within an umbral zone occluded by a secondary mirror of a reflective microscope objective and centered upon a probed locus on the surface of a sample;
    b. focusing light with the reflective microscope objective onto a region of the sample including the said probed locus on the surface of the sample;
    c. measuring a mechanical response of the sample to the applied force; and
    d. imaging the region of the sample including the probed locus, concurrently with measuring the mechanical response of the sample.

2. The method for characterizing a sample in accordance with claim 1, wherein the nanoprobe is a nanoindenter.

3. The method for characterizing a sample in accordance with claim 1, wherein the nanoprobe is a tip of an atomic force microscope.

4. The method for characterizing a sample in accordance with claim 1, wherein the mechanical response is a displacement as a function of force.

5. The method for characterizing a sample in accordance with claim 1, wherein the optical interaction is light scattering.

6. The method for characterizing a sample in accordance with claim 5, wherein the optical interaction is a non-linear optical interaction.

7. The method for characterizing a sample in accordance with claim 1, wherein the optical interaction is fluorescence.

8. The method for characterizing a sample in accordance with claim 6, wherein the optical interaction is second-harmonic generation.

9. The method for characterizing a sample in accordance with claim 6, wherein the optical interaction is two-photon fluorescence.

10. The method for characterizing a sample in accordance with claim 1, wherein characterizing the optical interaction includes spectral resolution of light scattered by the region of the sample including the probed locus.

11. The method for characterizing a sample in accordance with claim 1, wherein characterizing the optical interaction includes spectral resolution of light interacting with the region of the sample including the probed locus.

12. An apparatus for characterizing a sample in situ, the apparatus comprising:
    a. a source for generating an illuminating beam;
    b. a reflective objective for focusing the illuminating beam onto an illuminated region of a surface of a sample;
    c. a nanoindenter probe disposed within an umbral zone occluded by a secondary mirror of the reflective objective adapted for applying a force to a locus of the sample included within the illuminated region of the surface of the sample;
    d. a detector for receiving light emanating from the illuminated region of the surface of the sample coupled via the reflective objective and for generating a detector signal; and
    e. a processor for forming an image based at least upon the detector signal.

13. The apparatus in accordance with claim 12, wherein the reflective objective is a Schwartzchild objective.

14. The apparatus in accordance with claim 12, wherein the nanoindenter includes an actuator for applying a force to a nanotip.

15. The apparatus in accordance with claim 14, wherein the actuator includes a MEMS force probe.

16. The apparatus in accordance with claim 14, wherein the actuator includes a MEMS electrostatic comb drive.

* * * * *